United States Patent [19]

Jocoy

[11] 3,840,252
[45] Oct. 8, 1974

[54] TRAILER HITCH ADAPTER
[76] Inventor: Jesse L. Jocoy, 224 Bernice, Garland, Tex. 76142
[22] Filed: July 5, 1972
[21] Appl. No.: 269,201

[52] U.S. Cl........... 280/415 A, 280/423 B, 280/482, 280/491 E
[51] Int. Cl............................................. B60d 1/00
[58] Field of Search........ 280/415 A, 415 R, 415 B, 280/482, 491 R, 491 D, 491 E, 423 R, 423 B

[56] References Cited
UNITED STATES PATENTS

| | | | |
|---|---|---|---|
| 2,515,705 | 7/1950 | Gardiner | 280/476 R |
| 2,628,106 | 2/1953 | Sturwold | 280/440 X |
| 2,635,892 | 4/1953 | Shutter | 280/489 |
| 2,729,470 | 1/1956 | Seitz | 280/512 X |
| 3,411,644 | 11/1968 | Cook | 214/450 |
| 3,645,560 | 2/1972 | Steele | 280/482 |

Primary Examiner—Leo Friaglia
Attorney, Agent, or Firm—Clegg, Cantrell & Crisman

[57] ABSTRACT

Disclosed is a trailer hitch adapter for enabling a goose-neck type hitch assembly to be mounted on a standard A-frame type trailer hitch which includes an A-frame member and a socket member positioned at the apex of the A-frame member. The adapter includes a frame adapted to be mounted to the A-frame member of the trailer hitch, a goose-neck hitch assembly mounted on the frame and extending upwardly and away therefrom, a ball member mounted on the frame, and apparatus for demountably securing the frame to the underneath exposure of the A-frame member so that the ball member is received into the socket member of the trailer hitch.

5 Claims, 4 Drawing Figures

TRAILER HITCH ADAPTER

BACKGROUND OF THE INVENTION

This invention relates to trailer hitches and in particular to a trailer hitch adapter for mounting a gooseneck type trailer assembly onto a standard A-frame type trailer hitch.

The advantages of the so-called goose-neck trailer hitch, which is attached to a towing vehicle at a point above or forward of the rear axle of the towing vehicle, are well-known. Specifically, such trailer hitches provide greater stability while towing, better load and weight distribution on the towing vehicle and better maneuverability of the combination towing vehicle and trailer. Because of these advantages, trailers equipped with goose-neck hitches are in demand by possessors of towing vehicles having goose-neck hitch apparatus.

Most trailers, however, are equipped with the so-called A-frame hitch suitable for towing only with a bumper mounted hitch. Modification of an A-frame hitch to a goose-neck type hitch is costly, and such modification would normally result in the hitch becoming unsuitable for use with standard bumper mounted hitches.

SUMMARY OF THE INVENTION

It is an object of the present invention to provide a trailer hitch adapter having a goose-neck hitch assembly and adapted for mounting on an A-frame hitch.

It is another object of the present invention to provide such a trailer hitch adapter which may be easily mounted on and removed from an A-frame hitch.

These and other objects of the present invention are realized in a specific illustrative embodiment which includes a frame adapted to be mounted to the A-frame member of an A-frame trailer hitch, a goose-neck hitch assembly mounted on the frame, and apparatus for demountably securing the frame to the A-frame member of the trailer hitch to thereby provide a goose-neck hitch for the trailer on which the adapter is mounted.

DESCRIPTION OF THE DRAWINGS

A complete understanding of the present invention and of the above and other objects and advantages thereof may be gained from a consideration of the following detailed description of a specific illustrative embodiment presented in connection with the accompanying drawings in which.

DETAILED DESCRIPTION

Figure 1:
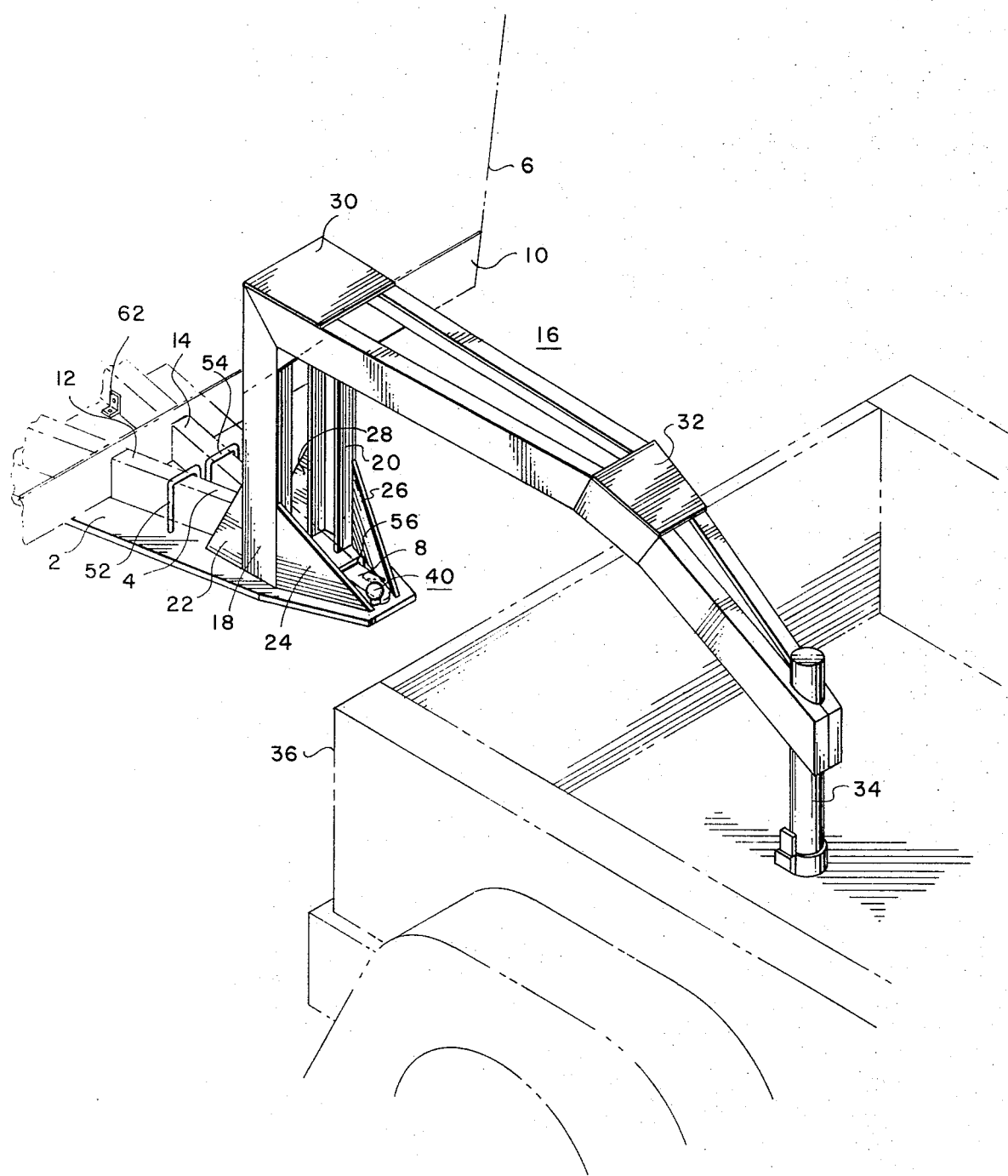
FIG. 1 shows a perspective view of a trailar hitch adapter made in accordance with the principles of the present invention.
Figure 2:
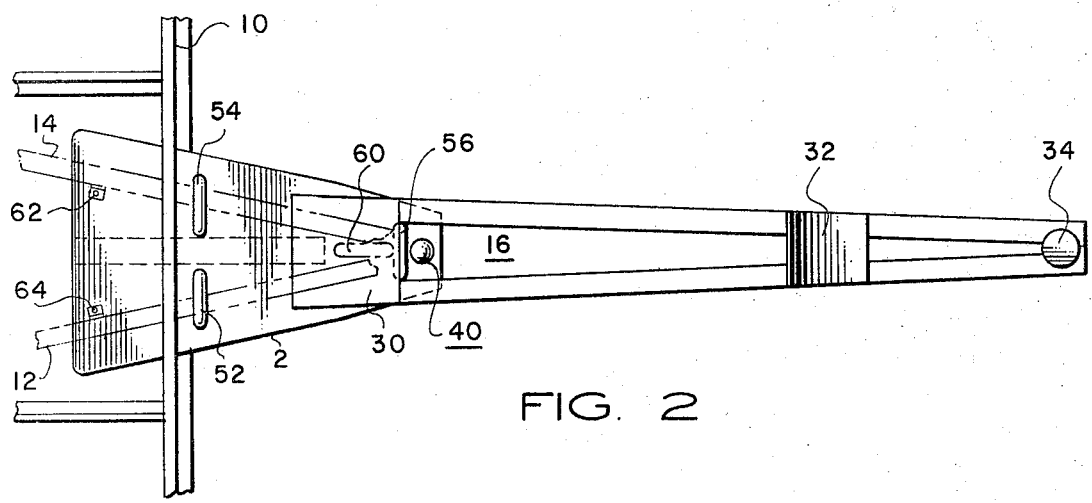
FIG. 2 shows a top plan view of such adapter.
Figure 3:
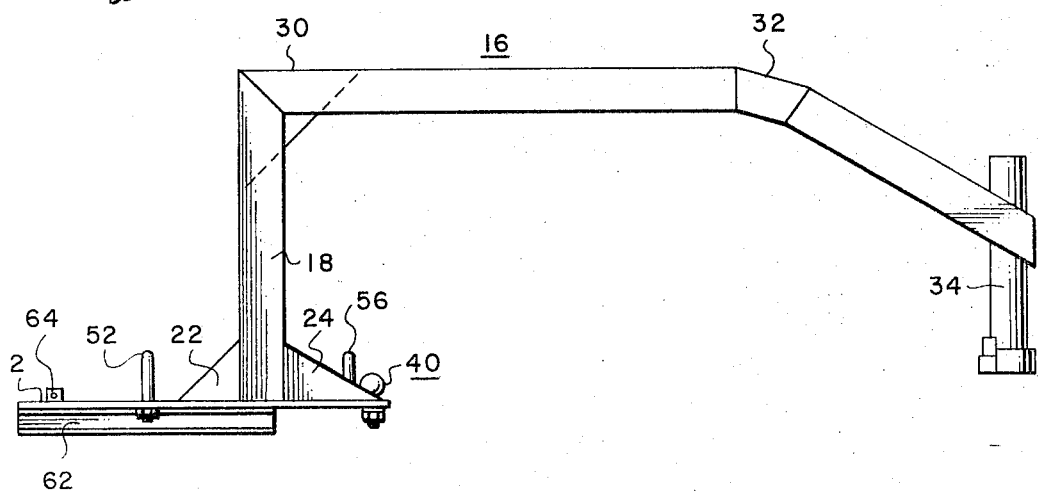
FIG. 3 shows a side elevational view of such adapter.

The illustrative trailer hitch adapter shown in FIGS. 1-3 includes a substantially flat, triangularly shaped plate 2 on which the other components of the adapter are mounted. That portion of the plate 2 having the largest width will be referred to as the base of the plate and that portion having the smallest width will be referred to as the apex of the plate. The dimensions of the plate 2 are such that when the plate is placed underneath an A-frame member 4 of a standard A-frame hitch of a trailer 6 so that the apex of the plate 2 extends just beyond the end of a socket member 8 of the A-frame hitch, the base of the plate 2 extends rearward to a point underneath the trailer bed 10 on which the trailer body rests and the sides of the plate 2 extend laterally beyond the two structural members 12 and 14 of the A-frame member 4 of the hitch.

Mounted on the plate 2 is a goose-neck hitch assembly generally designated by the numeral 16. The hitch assembly 16, which will be described assuming that the trailer hitch adapter is mounted on the A-frame trailer hitch shown in FIG. 1, includes two beams 18 and 20 extending upwardly from the plate 2 and triangular reinforcing plates 22-28 secured to corresponding ones of the beams 18 and 20 and to the plate 2. The beams 18 and 20 and corresponding reinforcing plates are spaced on the plate 2 to allow the A-frame hitch to extend therebetween to a point near the apex of the plate 2. Beams 18 and 20 are generally parallel and extend a certain distance above the plate 2 at which point each beam is formed to define a right angle and to extend in a direction away from the base of the plate 2 generally along the horizontal and then downwardly a certain distance to a point where the beams meet and are there joined together. A reinforcing plate 30 is secured to the beams 18 and 20 at the point where the beams form a right angle and a reinforcing plate 32 is secured to the beams 18 and 20 where the beams turn downwardly from the horizontal. Mounted on beams 18 and 20 where the beams are joined together is a standard goose-neck socket member 34 by which the goose-neck hitch assembly is attached to a towing vehicle 36. The goose-neck hitch assembly 16 described and shown is only illustrative of various types and structures of goose-neck hitch assemblies which could be utilized with the present invention.

Figure 4:
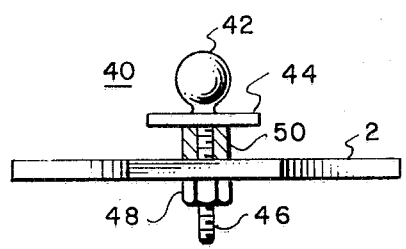
FIG. 4 shows a side elevational view of the ball member of such adapter.

A ball member 40 is mounted on the plate 2 at a point near the apex of the plate and generally midway between the sides thereof. Referring to FIG. 4, the ball member 40 includes a spherical portion 42 having a dimension substantially the same as the ball members of A-frame hitches on which the trailer hitch adapter of the FIGS. is intended for use. The ball member 40 further includes a base plate 44 integrally secured to the spherical portion 42 and a threaded shank 46 integrally secured to the base plate 44 on the opposite side from the spherical member 42. The ball member 40 is secured to the plate 2 by a nut 48 screwed on the shank 46 which is inserted through a hole provided in the base plate 2. Spacers of various sizes, such as spacer 50 shown in FIG. 4, may be positioned between the base plate 44 and the plate 2 to elevate the spherical portion 42 various distances above the plate 2. The reason for this provision will be discussed momentarily.

A longitudinal slot 60 is located in the plate 2 and extends along the center line of the plate beginning at a point approximately modway between the beams 18 and 20 and extending toward the apex of the plate 2 to a point just before the ball member 40. The slot 60 is provided to accommodate and allow the extension therethrough of the leg of a trailer jack which might be mounted on an A-frame hitch or which the trailer hitch adapter is to be secured. Because of the length of the slot 60, some latitude is allowed for mounting deviations of such trailer jacks.

A reinforcing beam 62 is secured to the underneath surface of the plate 2 and extends from the base of the plate along the center line thereof to a point just before the slot 60. The reinforcing beam 62, of course, adds strength to the trailer hitch adapter structure.

The trailer hitch adapter shown in FIGS. 1–3 is secured to the underneath exposure of the A-frame hitch of a trailer by means of U-bolts 52, 54 and 56. The trailer hitch adapter is secured to the A-frame hitch so that the socket member 8 of the hitch extends between the beams 18 and 20 and fits over the ball member 40 of the adapter. U-bolts 52 and 54 are fitted over beams 12 and 14 respectively of the A-frame member 4 of the hitch and U-bolt 56 is fitted over the hitch at a point where the beams 12 and 14 join and just behind the socket member 8 of the hitch. The ends of the U-bolts extend through holes in the plate 2 and secured to the plate by nuts. By placing the socket member 8 over the ball member 40 of the trailer hitch adapter, lateral, forward and rearward movement of the adapter is prevented so that the adapter is thus more rigidly secured to the A-frame hitch. Since the relative vertical position of the socket member 8 with respect to the plate defined by the A-frame member 4 may be different for different A-frame hitches, provision is made for adjusting the height of the spherical portion 42 of the ball member 40 above the plate 2 to accommodate such differences.

To provide additional rigidity to the trailer hitch adapter when mounted, right angle braces 62 and 64 could be mounted on the top of the plate 2 near the base thereof after determining the relative positions of braces 12 and 14 of the trailer to which the trailer hitch adapter was to be secured. The braces would be positioned so that the upward extensions of the braces 62 and 64 were contiguous with the walls of beams 14 and 12 respectively when the trailer hitch adapter was mounted on the trailer. The braces would then be bolted to both the plate 2 and beams 12 and 14.

It is clear from the above description of one illustrative embodiment of the present invention that numerous alternative embodiments and modifications could be devised by those skilled in the art without departing from the spirit and scope of the invention. The appended claims are intended to cover all such apparent and obvious modifications.

What is claimed is:

1. A trailer hitch adapter including
  a frame adapted to be mounted to the A-frame member of an A-frame type trailer hitch,
  a goose-neck hitch assembly mounted on said frame,
  means for demountably securing said frame to the A-frame member of the trailer hitch,
  a ball member mounted on said frame to extend thereabove and to be received into the socket member of the trailer hitch when the frame is mounted on the trailer hitch, and
  means for positioning said ball member to extend a plurality of different distances above said frame.

2. A trailer hitch adapter comprising
  a substantially flat plate adapted to be secured to the underneath exposure of the A-frame member of an A-frame type trailer hitch, said plate being of a generally triangular shape having an apex and a base,
  a goose-neck hitch assembly mounted on said plate, said goose-neck assembly being adapted to straddle said A-frame member and extending upwardly from said plate at least a pair of U-bolts for fitting over different structural portions of the A-frame member and onto said plate for demountably securing said plate to the A-frame member so that the apex of the plate extends frontwardly beyond the apex of the A-frame member, the base of the plate extends rearwardly away from the apex of the A-frame member, and the sides of the plate extend laterally beyond the structural portions of the A-frame member, and
  a reinforcing member affixed to and extending along the underneath surface of said plate.

3. A trailer hitch adapter as in claim 2 wherein said plate has a slot therein for allowing a trailer jack mounted on the trailer hitch to extend therethrough.

4. A trailer hitch adapter as defined in claim 2 wherein the distance between the apex of said plate and the base of said plate is greater than the distance between the apex of the A-frame member and the most forward beam of the trailer transverse to the A-frame member whereby the plate can be demountably connected to said A-frame member by fastening means including said U-bolts positioned both forward and rearward of said most forward beam.

5. A trailer hitch adapter for mounting on a trailer hitch which includes an A-frame member and a socket member positioned at the apex of the A-frame member comprising
  a substantially flat plate adapted to be secured to the underneath exposure of said A-frame member, said plate being of a generally triangular shape having an apex and a base,
  a goose-neck hitch assembly mounted on said plate and including two substantially parallel and spaced beams extending upwardly from the plate and then curving downwardly into a goose-neck shape to a point where the beams meet,
  a ball member mounted on said plate to extend thereabove, said ball member being positioned at a point near the apex of the plate and midway between the sides thereof, and
  means for demountably securing said plate to the underneath exposure of said A-frame member so that said socket member extends between the two beams of said goose-neck hitch assembly to receive said ball member and so that the base of said plate extends rearward away from the apex of said A-frame member.

* * * * *